US009658676B1

(12) United States Patent
Witek et al.

(10) Patent No.: US 9,658,676 B1
(45) Date of Patent: *May 23, 2017

(54) SENDING MESSAGES IN A NETWORK-ON-CHIP AND PROVIDING A LOW POWER STATE FOR PROCESSING CORES

(71) Applicant: Amazon Technologies, Inc., Seattle, WA (US)

(72) Inventors: Richard Thomas Witek, Redmond, WA (US); Long Li, Cupertino, CA (US); Maya Suresh, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/626,716

(22) Filed: Feb. 19, 2015

(51) Int. Cl.
*G06F 1/32* (2006.01)
*G06F 13/24* (2006.01)
*G06F 5/14* (2006.01)

(52) U.S. Cl.
CPC .............. *G06F 1/3237* (2013.01); *G06F 5/14* (2013.01); *G06F 13/24* (2013.01)

(58) Field of Classification Search
CPC ......... H04L 47/31; H04L 47/30; H04L 69/12; G06F 2213/0038; Y02B 60/1228
USPC ................................................. 713/323, 320
See application file for complete search history.

(56) References Cited

U.S. PATENT DOCUMENTS

| 7,822,893 | B2 * | 10/2010 | Yoon | G06F 13/28 710/30 |
| 8,040,799 | B2 * | 10/2011 | Hoover | H04L 45/06 370/208 |
| 8,605,578 | B1 | 12/2013 | Govindaraju et al. | |
| 9,015,448 | B2 * | 4/2015 | Krishna | G06F 15/17337 712/16 |
| 2004/0165590 | A1 * | 8/2004 | Reiner | H04L 12/5695 370/392 |
| 2007/0153803 | A1 * | 7/2007 | Lakshmanamurthy | H04L 12/5693 370/395.43 |
| 2008/0151919 | A1 | 6/2008 | Li et al. | |
| 2009/0252171 | A1 * | 10/2009 | Kumar | H04L 45/00 370/397 |

(Continued)

OTHER PUBLICATIONS

Office Action for U.S. Appl. No. 14/626,637, mailed on Aug. 11, 2016, Richard Thomas Witek, "Sending Messages in a Network-On-Chip and Providing a Low Power State for Processing Cores", 12 pages.

*Primary Examiner* — Thomas Lee
*Assistant Examiner* — Santosh R Poudel
(74) *Attorney, Agent, or Firm* — Lee & Hayes, PLLC

(57) ABSTRACT

Subject matter disclosed herein relates to arrangements and techniques for sending messages directly among processing cores and directly among co-processors over a network-on-chip (NoC). More particularly, the present disclosure provides an Application Specific Integrated Circuit (ASIC) that includes processing cores coupled together with a NoC. Each processing core and co-processor includes two corresponding buffers. A first buffer is for sending messages and a second buffer is for receiving messages. Messages are sent from a processing core directly to another processing core through the NoC. Messages are also sent from a co-processor directly to another co-processor through the NoC.

24 Claims, 13 Drawing Sheets

(56) References Cited

U.S. PATENT DOCUMENTS

| | | | |
|---|---|---|---|
| 2009/0304017 A1* | 12/2009 | Lee | H04L 45/00 370/412 |
| 2011/0296222 A1 | 12/2011 | Tan et al. | |
| 2011/0314255 A1* | 12/2011 | Krishna | G06F 15/17337 712/16 |
| 2012/0155271 A1* | 6/2012 | Ma | H04L 49/90 370/235 |
| 2013/0083673 A1* | 4/2013 | Chow | H04L 12/2885 370/252 |
| 2013/0103912 A1* | 4/2013 | Jones | G06F 12/0891 711/144 |
| 2013/0136129 A1* | 5/2013 | Locatelli | H04L 45/74 370/392 |
| 2015/0103822 A1* | 4/2015 | Gianchandani | H04L 69/08 370/389 |
| 2015/0188847 A1* | 7/2015 | Chopra | H04L 45/306 370/401 |
| 2016/0077568 A1 | 3/2016 | Kandula et al. | |

* cited by examiner

SENDING MESSAGES IN A NETWORK-ON-CHIP AND PROVIDING A LOW POWER STATE FOR PROCESSING CORES

BACKGROUND

Many portable or stationary electronic devices are becoming more complex and using various technologies for controlling the portable electronic devices as well as for providing various user functionality and interactions. The implementation of these complex technologies and the processing associated therewith can require a large amount of resources from the portable electronic device's application processor and/or central processing unit (CPU), as well as various associated circuits such as, for example, Application Specific Circuits (ASICs). Such processing requirements can result in slower performance by the portable electronic device, greater power requirements, and/or the need for larger and more powerful processors for the portable electronic device.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1A:
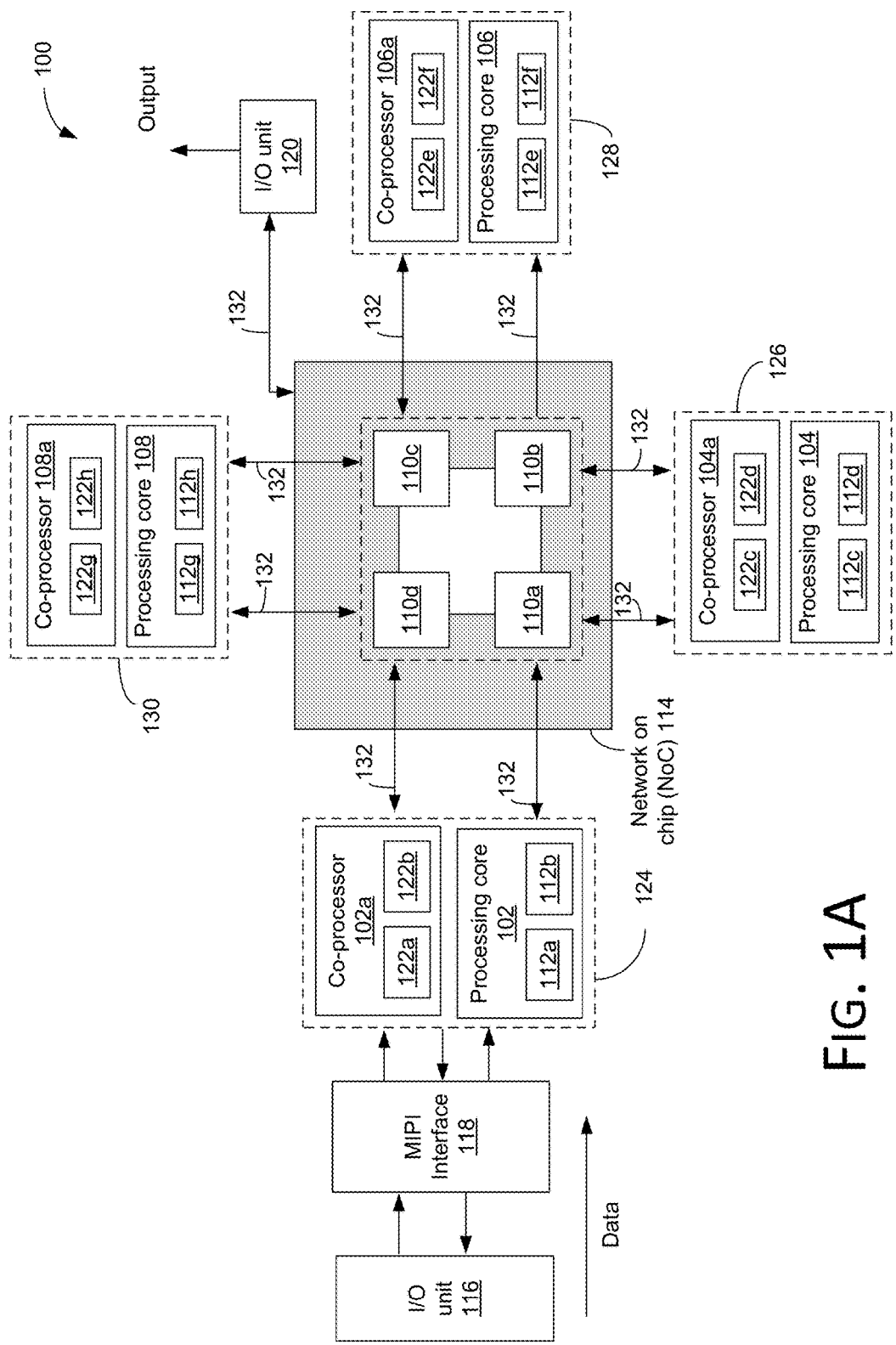
FIGS. 1A-1I schematically illustrate an Application Specific Integrated Circuit (ASIC) and channels for data flow, in accordance with various embodiments.
Figure 1B:
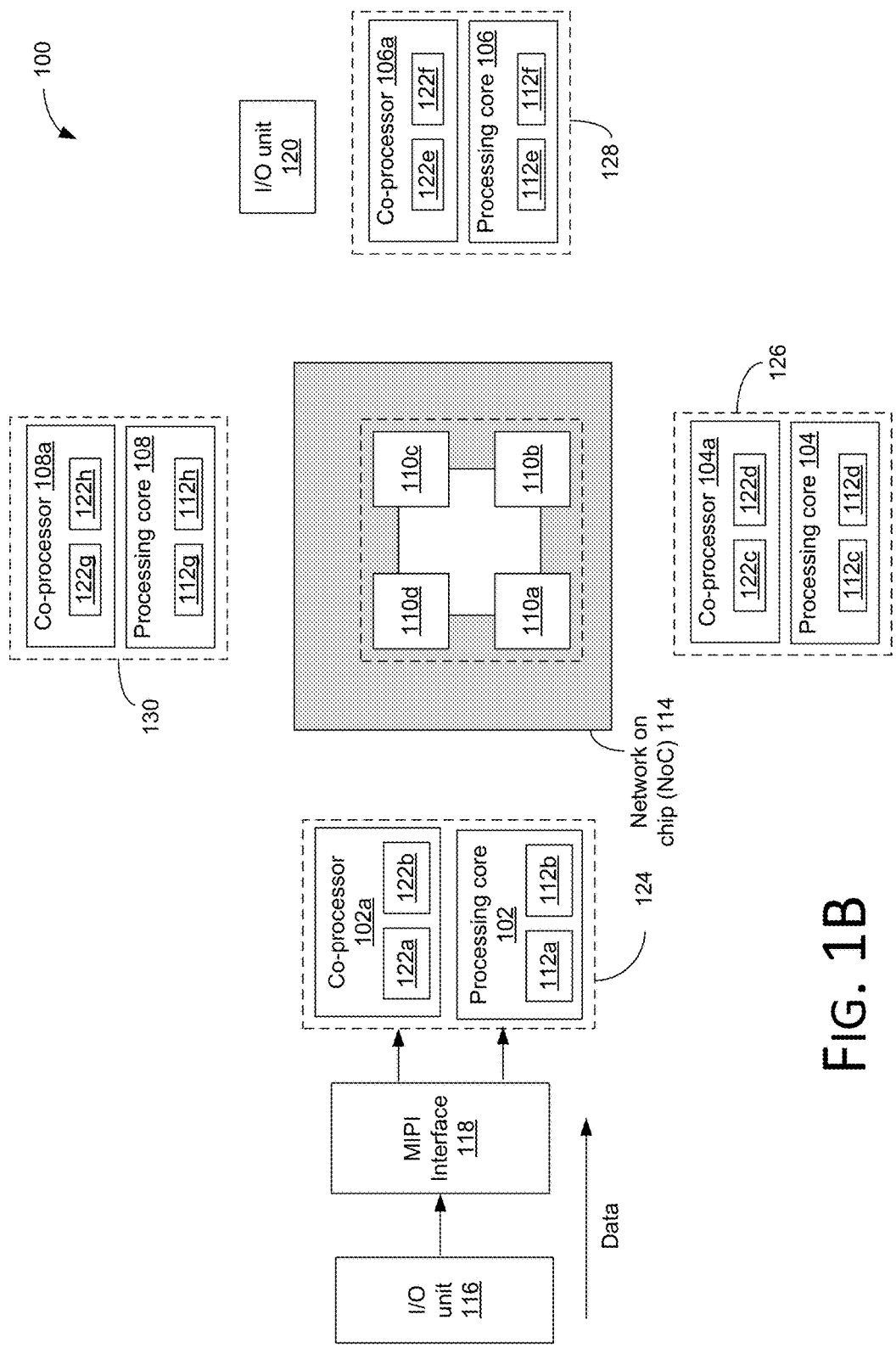

The present disclosure provides arrangements and techniques for sending messages among processing cores over a network-on-chip (NoC). More particularly, the present disclosure provides an Application Specific Integrated Circuit (ASIC) that includes processing cores and co-processors coupled together with a NoC. Each processing core and co-processer includes two corresponding buffers. A first buffer is for sending messages and a second buffer is for receiving messages. If a processing core or co-processor needs to send a message and the corresponding first buffer is full, if the message includes a flag that indicates a WAIT function, then the processing core and/or co-processor waits and enters a low power state until the first buffer is available so that the message can be sent; otherwise the message is ignored and not sent. As is known, a flag field is an integer interpreted as a sequence of boolean bits (i.e. one or more bits), each called a "flag," where Boolean algebra is a subarea of algebra in which the values of the variables are the truth values true and false, usually denoted 1 and 0, respectively. Additionally, if a second buffer is empty, then the corresponding processing core and/or co-processor enters the low power state. Also, the present disclosure provides arrangements and techniques for sending messages directly between processing cores over the NoC and bypassing intermediate steps of writing to and reading from memory.

A portable electronic device such as, for example, a smartphone, a tablet computing device, a notebook computing device, etc., generally displays content on a display. The content can include, for example, images, words, etc. Such content can be displayed to a user for viewing. Such portable electronic devices generally also perform various communication functions, various computing functions and accessing of various networks.

In accordance with various embodiments, an ASIC included with such a portable electronic device includes a plurality of processing cores coupled together with a NoC. Messages in the form of, for example, data, instructions, etc. are transmitted among the processing cores via the NoC. The ASIC further includes memory. Each processing core includes two buffers. A first buffer is configured to queue messages to be sent by the corresponding processing core and is generally referred to as a send buffer. A second buffer is configured to queue messages received by the corresponding processing core and is generally referred to as a receive buffer. In accordance with various embodiments, the buffers are first-in first-out (FIFO) buffers. In various embodiments, the ASIC further includes co-processors, where each individual co-processor is associated with a corresponding processing core to provide processing nodes. Each co-processor includes two buffers. A first buffer is configured to queue messages to be sent by the corresponding processing core and is generally referred to as a send buffer. A second buffer is configured to queue messages received by the corresponding processing core and is generally referred to as a receive buffer. In accordance with various embodiments, the buffers are first-in first-out (FIFO) buffers.

In embodiments, messages sent among the processing cores include a bit that may be set to indicate a WAIT function for the message. If a message that needs to be sent by a processing core has the WAIT function activated and the processing core's send buffer is full, then the processing core will wait for space in the send buffer to become available so that the message can be moved into the send buffer for sending. While the processing core is waiting, the processing core enters a low power state. If the message does not include a WAIT function, then the message is ignored and/or discarded and the processing core continues to operate in its current state.

In embodiments, if a message that is to be received by a processing core has the WAIT function activated and the processing core's receive buffer is full, then the processing core will wait for space in the receive buffer to become available so that the message can be received. While the processing core is waiting, the processing core enters a low power state. If the message does not include a WAIT function, then the message is ignored and/or discarded and the processing core continues to operate in its current state.

FIG. 1 schematically illustrates a circuit that may be an Application Specific Integrated Circuit (ASIC) 100 that includes four processing cores (cores) 102, 104, 106 and 108 to perform various computing operations and data processing. In accordance with embodiments, the four cores 102, 104, 106 and 108 are four scaler Microprocessor without Interlocked Pipeline Stages (MIPS) cores. More or fewer processing cores may be included with the ASIC 100 depending upon desired configurations and applications. The ASIC 100 further includes memory 110*a, b, c* and *d*. In accordance with various embodiments, the internal memory is static random access memory (SRAM) and is 1 megabyte (MB). More or less memory may be included if desired.

Each core 102, 104, 106 and 108 includes two of buffers 112*a*, 112*b*, 112*c*, 112*d*, 112*e*, 112*f*, 112*g* and 112*h*. One of the two buffers is generally a send buffer for queuing messages to be sent, while the other buffer is a receive buffer for queuing messages that are received. Thus, buffers 112*a*, 112*c*, 112*e* and 112*g* are send buffers, while buffers 112*b*, 112*d*, 112*f* and 112*h* are receive buffers. In accordance with various embodiments, each buffer includes four locations, wherein each location can hold a 32 bit message. More or less locations may be included in each buffer if desired. Additionally, each location may be sized to hold larger or smaller messages if desired.

The ASIC 100 further includes a Network-On-Chip (NoC) 114 that couples the cores 102, 104, 106 and 108 together for sending and receiving messages among the cores 102, 104, 106 and 108. As is known, a NoC is an emerging option for communications within large very large scale integration (VLSI) systems implemented on a single silicon chip. In a NoC system, modules such as processing cores, memories and specialized internet protocol (IP) blocks exchange data, instructions, etc. using a network as a "public transportation" sub-system for the information traffic. A NoC is generally constructed from multiple point-to-point data links interconnected by switches (also referred to as routers), such that messages can be relayed from any source module to any destination module over several links by making routing decisions at the switches. A NoC is similar to a modern telecommunications network, using digital bit-packet switching over multiplexed links. Although packet-switching is sometimes claimed as a necessity for a NoC, there are several NoC proposals utilizing circuit-switching techniques. The definition of a NoC based on routers is usually interpreted such that a single shared bus, a single crossbar switch or a point-to-point network are generally not NoCs but practically all other topologies are considered NoCs.

The ASIC 100 further includes a first input/output (I/O) unit 116 to receive data from an external source. As can be seen, at least the core 102 is in communication with the I/O unit 116 via a Mobile Industry Processor Interface (MIPI) interface 118. One or more of the cores 104, 106 and 108 may also be in communication with the I/O unit 114 in addition to (or instead of) the core 102. A second I/O unit 120 is in communication with an application processor (not illustrated) of a portable electronic device (not illustrated) that includes the ASIC 100 in order to provide output from the ASIC 100 to the application processor.

In accordance with various embodiments, the ASIC 100 includes three co-processors 102*a*, 104*a* and 106*a* associated with cores 102, 104 and 106, respectively. The co-processors 102*a*, 104*a* and 106*a* perform various computing operations and data processing. In an embodiment, a fourth co-processor 108*a* is included that is associated with core 108. Thus, in accordance with embodiments, one or more of any cores included in the ASIC 100 may have a co-processor associated therewith. Each co-processor 102*a*, 104*a* and 106*a* includes two of buffers 122*a*, 122*b*, 122*c*, 122*d*, 122*e* and 122*f*. One of the two buffers is generally a send buffer for queuing messages to be sent, while the other buffer is a receive buffer for queuing messages that are received. Thus, buffers 122*a*, 122*c* and 122*e* are send buffers, while buffers 122*b*, 122*d* and 122*f* are receive buffers.

The cores 102, 104, 106 and 108 along with corresponding co-processors 102*a*, 104*a*, 106*a* and 108*a* provide processing nodes 124, 126, 128 and 130, respectively. The NoC 114 couples the processing nodes 124, 126, 128 and 130 to allow the processing nodes to communicate with each other, as well as with the memory 110*a, b, c* and *d*. Cores 102, 104, 106 and 108 may communicate directly with each other as well as with the memory 110*a, b, c* and *d* via the NoC 114. Likewise, co-processors 102*a*, 104*a*, 106*a* and 108*a* may communicate directly with each other as well as with the memory 110*a, b, c* and *d* via the NoC 114. In embodiments, cores 102, 104, 106 and 108 may also communicate with co-processors 102*a*, 104*a*, 106*a* and 108*a* via the NoC 114, and vice versa. However, generally a core does not communicate with itself or its associated co-processor via the NoC 114, and vice versa.

As an example embodiment, in accordance with various embodiments the processing node 124 is configured as an image node that receives images from an external source such as, for example, one or more cameras, via the I/O unit 116 and the MIPI interface 118. The processing node 124 processes the received images so that the images can be searched for an object. The processing of the images can include, for example, exposure correction in the form of a black level correction, defective pixel correction, and a statistical analysis of the images. Once the processing node 124 has processed the images, the images are provided to the processing node 126, which is configured as a search node of the ASIC 100. The processing node 126 generally scales the image down such that a minimum size of an object of interest, such as, for example, a user's face, can fit within a search window. In an embodiment, the processing node 126 then searches for the object of interest within a first image. The processing node 126 will progressively search within the first image and will continue to scale the first image down such that a maximum size of the object of interest will fit within the search window. The downsizing and searching of the first image continues until a location of the object of interest within the first image can be determined within the region of interest. Once the processing node 126 determines that it has found the object of interest within the region of interest, the processing node 126 searches a second image in order to determine if the object of interest can be found in a similar region of interest within the second image.

In accordance with the example embodiment, once the processing node 126 has identified the presence of the object of interest in both the first and second images, the images are provided to the processing node 128, which is configured as an ensemble node of the ASIC 100. The processing node 128 is utilized to confirm the presence and size of the object of interest in the region of interest in the first image and the corresponding region of interest in the second image. In accordance with various embodiments, a template is utilized by the processing node 128 to compare, pixel-by-pixel, the region of interest in the first image and, pixel-by-pixel, the region of interest in the second image. If the processing node 128 confirms the presence and size of the object of interest in the two images, then the images may be provided back to the processing node 126 to extract various features from the images. The features from the object of interest may then be provided to the application processor (not illustrated) for various purposes. In accordance with the example embodiment, the processing node 130 is configured as a master node that serves as "the command and control block" for the ASIC 100. The processing node 130 is generally responsible for boot and power management, as well as controlling the three other processing nodes 124, 126 and 128 in the ASIC 100.

In an embodiment, the cores 102, 104, 106 and 108 issue commands for their corresponding co-processors 102a, 104a, 106a and 108a to perform various tasks such as, for example, special functions or data processing on data. The co-processors 102a, 104a, 106a and 108a perform the tasks and inform the cores 102, 104, 106 and 108 when the tasks are complete via, for example, interrupts. The data can then be moved into a corresponding send buffer and sent from the processing node to the memory 110a, b, c, or d, or to another processing node, via the NoC 114. In embodiments where one or more of the cores 102, 104, 106 and/or 108 do not include a co-processor, then the core itself may perform the tasks.

In accordance with embodiments, if the data is sent to the memory by one of the co-processors 102a, 104a, 106a and 108a of a processing node 124, 126, 128 or 130, then the corresponding core 102, 104, 106 and 108 of the processing node notifies one of the other cores of the other processing nodes that next needs the data with a message via the NoC 114 that indicates the location in memory of the data. The other processing node then retrieves the data based upon the memory location within the message. In accordance with embodiments, the message that includes the memory location is generally 32 bits in size, although other sizes may be used if desired. Thus, the buffers 112 of the cores 102, 104, 106 and 108 are sized to hold messages of 32 bits (or whatever the message size is). In accordance with various embodiments, if the data, in the form of a message, is sent directly from one of the processing nodes 124, 126, 128 or 130 to another of the processing nodes 124, 126, 128 or 130, i.e. a co-processor sends the data to another co-processor, then the message generally has a size of 80 bits, although other sizes may be used if desired. Thus, the buffers 122 of the co-processors 102a, 104a, 106a and 108a are sized to hold messages of 80 bits (or whatever the message size is). As an example, the 80 bit messages include 64 bits used for data packed in little endian order. The remaining 16 bits are used to pass control and routing information. Larger or smaller size messages may be used if desired. Table 1 below provides an example of an 80-bit packet definition.

TABLE 1

80-bit Packet definition

| Field | Bits | Use |
| --- | --- | --- |
| Source Processing Core | [79:77] | Source node of data |
| Source Buffer | [76:75] | Source node NMW |
| Destination Processing Core | [74:72] | Destination node for data |
| Destination Buffer | [71:70] | Destination NMR at node |
| Rsv | [69] | Reserved should be zero |
| SOF | [68] | Start Of Frame (SOF) if set this packet is the start of a frame. Both SOF and EOF could be set for short, <= 8 byte, frame. |
| EOF | [67] | End Of Frame (EOF) if set this packet is the end of a frame is end of Frame. Both SOF and EOF could be set for short, <= 8 byte, frame. |
| CntM1 | [65:64] | Count of valid bytes in packet minus 1. All packets with EOF == 0 should set this field to 7 and pass 8 bytes. The last packet in a frame can send less than 8 bytes. The bytes |

TABLE 1-continued 80-bit Packet definition

| Field | Bits | Use |
| --- | --- | --- |
| | | are packed in little endian order so first byte is d[7:0] and last byte is in D[63:56] |
| D | [63:0] | Data of packet. 1-8 bytes valid |

More particularly, in accordance with various embodiments, messages in the form of, for example, data, instructions, etc. are transmitted among the processing nodes 124, 126, 128 and 130 via the NoC 114. As previously noted, each core 102, 104, 106 and 108 includes a first buffer that is configured to queue messages to be sent by the corresponding core and is generally referred to as a send buffer. A second buffer is configured to queue messages received by the corresponding core and is generally referred to as a receive buffer. In accordance with various embodiments, the buffers are first-in first-out (FIFO) buffers. In accordance with embodiments, as previously noted, messages transmitted between the cores via the NoC 114 comprise 32 bits, although larger or smaller size messages may be used if desired. A bit is also included within each message, or within a header for the message, that, if set, provides a flag that indicates a WAIT function, as will be described further herein. Likewise, as previously noted, each co-processor 102a, 104a, 106a and 108a includes a first buffer that is configured to queue messages to be sent by the corresponding core and is generally referred to as a send buffer. A second buffer is configured to queue messages received by the corresponding co-processor and is generally referred to as a receive buffer. In accordance with various embodiments, the buffers are first-in first-out (FIFO) buffers. In accordance with embodiments, messages transmitted between the co-processors via the NoC 114 comprise 80 bits, although larger or smaller size messages may be used if desired. A bit is included within each message, or within a header for the message, that, if set, provides a flag that indicates a WAIT function, as will be described further herein. Generally, whether a message includes a WAIT function depends upon the application being performed by the ASIC 100 and the software and/or firmware designers that design the particular application In embodiments, a low power state for the cores 102, 104, 106 and 108, as well a co-processors 102a, 104a, 106a and 108a, includes deactivating or "gating" one or more clocks of the corresponding core and/or co-processor in the low power state until the one or more clocks are needed for operation of the corresponding core. Generally, in accordance with embodiments, when a core enters the low power state, the corresponding co-processor also enters the low power state, and vice versa. However, this may not always be the case. Examples of clocks within the cores and co-processors that may be gated include, but are not limited to, a clock for instruction fetching, a clock for instruction decoding, a clock for instruction execution, a clock for memory writing-back, and a clock for register writing-back. Generally, most of the clocks of the corresponding core and/or co-processor are deactivated except for one or more clocks that are used to (i) send and receive messages, (ii) handle traffic to and from the memory of the corresponding core, and (iii) handle interrupts. An example of an interrupt is a timer interrupt. For example, software or firmware can set an expiration timer before the core and/or co-processor executes an instruction that includes the WAIT function. If the corresponding receive buffer is empty, the core or co-processor gates its corresponding clock and is in a low-power mode. However, when the timer expires and a timer interrupt is sent to the core or co-processor, the core or co-processor wakes up and keeps executing the instruction that includes the WAIT function. This could help to debug a long-time waiting issue. Each core 102, 104, 106 and 108, as well as co-processors 102a, 104a, 106a and 108a, generally includes its own logic for turning clocks on and off.

In embodiments, as previously noted, messages sent among the cores 102, 104, 106 and 108, as well as the co-processors 102a, 104a, 106a and 108a, include a bit that may be set to provide a flag to indicate a WAIT function for the message. If a message that needs to be sent by one of the cores 102, 104, 106 and 108, or one of the co-processors 102a, 104a, 106a and 108a, has the WAIT function activated and the corresponding send buffer is full, then the core or co-processor will wait for space in the corresponding send buffer to become available so that the message can be moved into the corresponding send buffer and then sent. While the core or co-processor is waiting, the core and/or co-processor may enter the low power state. If the message to be sent does not include a WAIT function, then the message is ignored and/or discarded and the core and/or co-processor may continue to operate in its current state. In such a situation, the core or co-processor provides a returning status informing the application running on the ASIC 100a that the corresponding send buffer is full and the message has not been loaded into the corresponding send buffer successfully.

In embodiments, if a message that is to be sent by one of the cores 102, 104, 106 and 108, or one of the co-processors 102a, 104a, 106a and 108a, has the WAIT function activated and the receiving core's receive buffer or receiving co-processor's receive buffer is full, then the core or co-processor wanting to send the message will wait for space in the receiving core's receive buffer or receiving co-processor's receive buffer to become available so that the message can be received. If the message to be sent does not include a WAIT function, then the message is ignored and/or discarded and the sending core or co-processor may continue to operate in its current state. While the sending core or co-processor is waiting to send the message with the WAIT function and if the sending core's send buffer or sending co-processor's send buffer is full, the sending core and/or co-processor may enter a low power state.

In embodiments, if a core's receive buffer or a co-processor's receive buffer is empty, then the core and/or co-processor may enter the low power state while the core and/or co-processor waits to receive a new message. The core and/or co-processor may enter the low power state even if the core's send buffer and/or the co-processor's send buffer includes messages to be sent since, as previously mentioned, in the low power state one or more clocks used for sending and receiving messages remain active and thus messages in the core's send buffer and/or the co-processor's send buffer may still be sent while the core and/or co-processor is in the low power state. Additionally, if a core or co-processor is waiting for a message from another core or co-processor and the message includes the WAIT function, then the core and/or co-processor waiting for the message may enter the low power state. More particularly, a core or co-processor can use the WAIT function to receive messages such that if the corresponding receive buffer is empty, then the core or co-processor keeps executing and provides a returning status informing the application running on the ASIC 100 that no valid entry has been fetched by the core or co-processor from the corresponding receive buffer. If the core or co-processor uses the WAIT function and the corresponding receive buffer is empty, the core and/or co-processor stops execution, gates one or more of its clocks and enters the low power state until a message is received at the corresponding receive buffer and the core and/or co-processor "wakes up," enters the active state, activates the one or more clocks that were gated and fetches and moves the received message from the corresponding receive buffer.

Thus, when one of the cores 102, 104, 106 and 108, or co-processors 102a, 104a, 106a and 108a, is waiting due to a message that includes a WAIT function or due to an empty receive buffer, the corresponding core and/or co-processor is generally interrupted. Once the message that includes a WAIT has been sent, the corresponding core and/or co-processor "wakes up" and enters a normal operating state. Likewise, when a core or co-processor that is waiting for a message that includes a WAIT function receives the message, the corresponding core and/or co-processor "wakes up" and enters a normal operating state with one or more of the inactive clocks being reactivated.

As previously noted, the processing nodes 124, 126, 128 and 130 can communicate directly with each other via the NoC 114. Thus, the processing cores 102, 104, 106 and 108 can communicate directly with each other via the NoC 114. Likewise, the co-processors 102a, 104a, 106a and 108a can communicate directly with each other via the NoC 114. In embodiments, the NoC 114 includes dedicated virtual channels that couple the processing nodes 124, 126, 128 and 130. FIGS. 1A-1I illustrate various virtual channels 132 that can be included within the NoC 114. While the virtual channels 132 are illustrated as being between the processing nodes 124, 126, 128 and 130 and the memory 110, it is to be understood that the virtual channels 132 couple the processing cores 102, 104, 106 and 108 with each other via the NoC 114, as well as coupling the co-processors 102a, 104a, 106a and 108a with each other via the NoC 114. Additionally, while virtual channels 132 are illustrated as coupling only some of the processing nodes, other virtual channels may be included to couple other processing nodes. For example, while the example embodiments of FIGS. 1A-1I do not illustrate a virtual channel that directly couples processing node 124 and processing node 130, such a virtual channel may be included depending upon the application. In accordance with various embodiments, the virtual channels 132 are dedicated virtual channels.

Figure 1C:
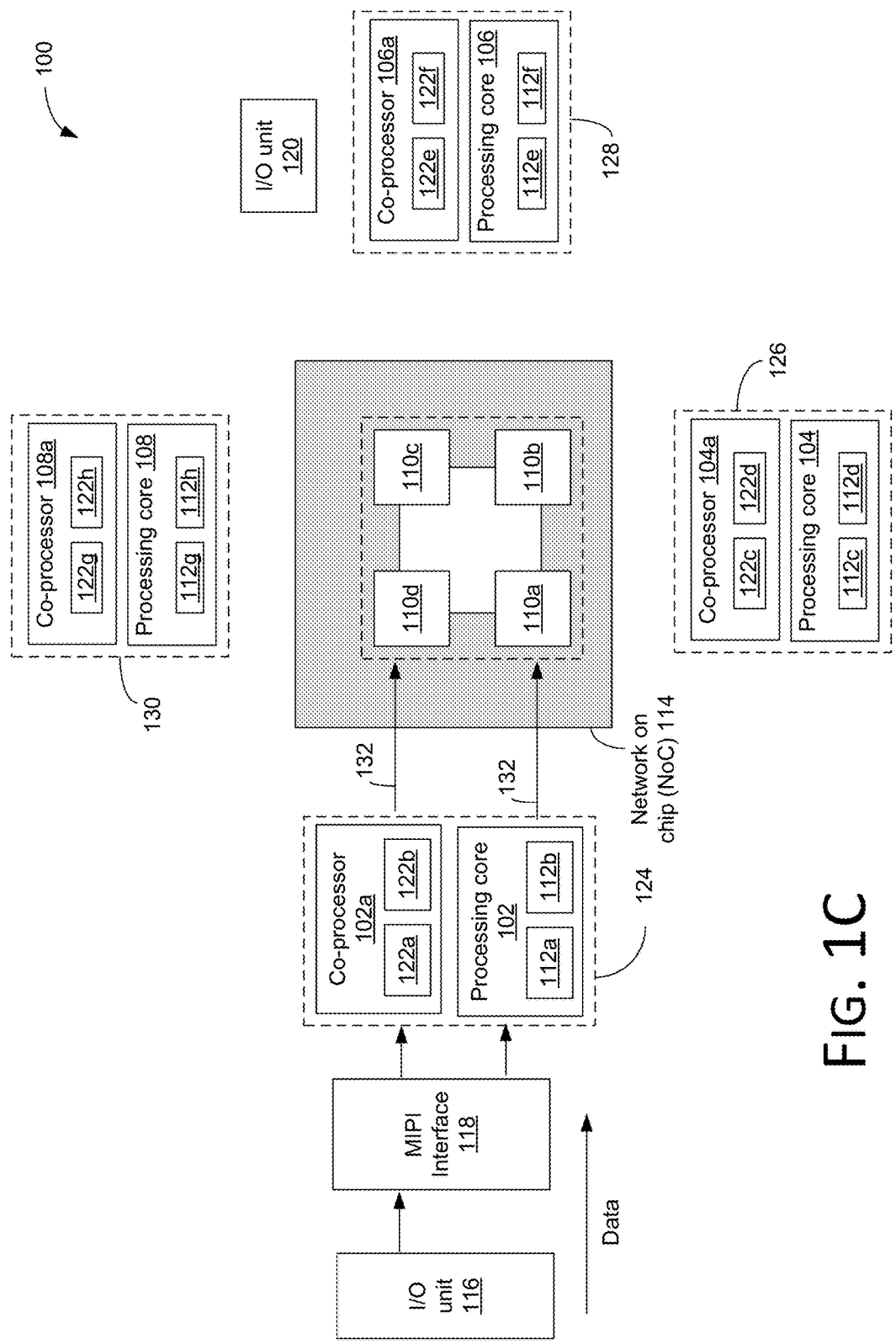
Figure 1D:
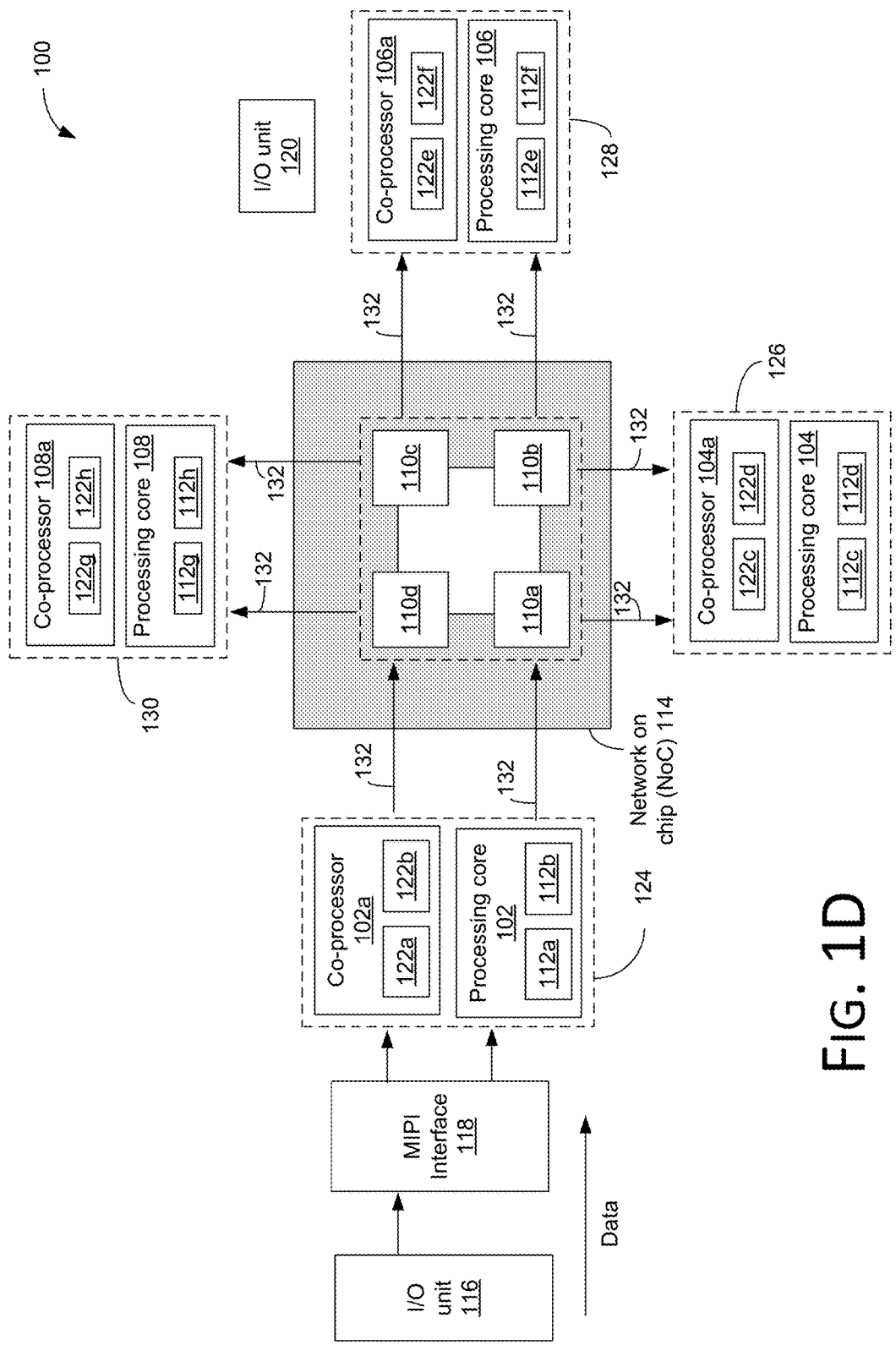
Figure 1E:
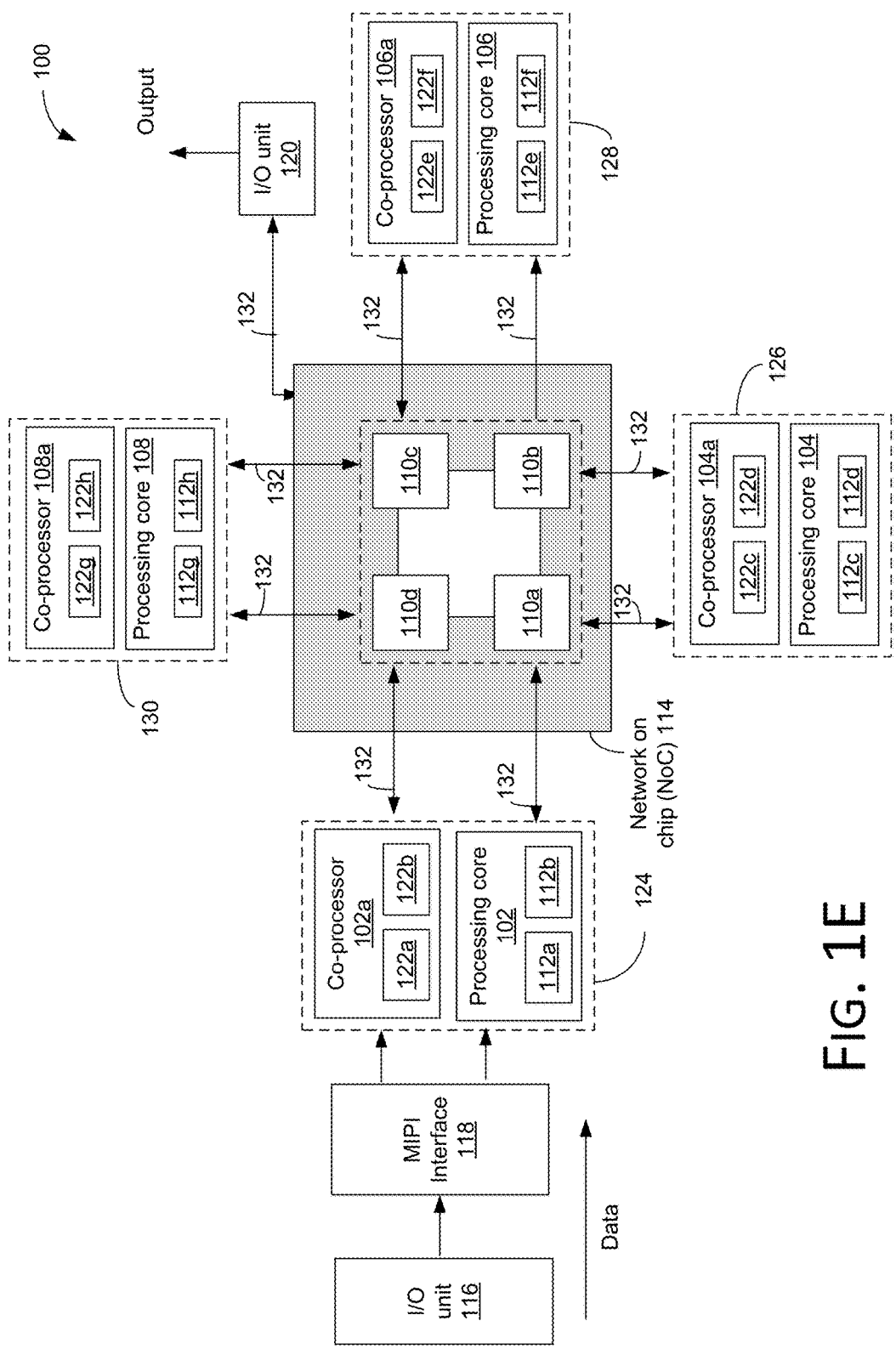

Accordingly, the processing nodes 124, 126, 128 and 130 can communicate with the memory 110 via the NoC 114. Additionally, the processing cores and co-processors of the processing nodes 124, 126, 128 and 130 can communicate directly with each other via the NoC 114. For example, in FIG. 1A, it is illustrated that the processing nodes 124, 126, 128 and 130 communicate with the memory 110 via the NoC 114. Thus, for example, with reference to FIG. 1B, data can flow from the I/O unit 116 to the MIPI interface 118 and on to the processing node 124. Referring to FIG. 1C, the data can then flow from the processing node 124 to the memory 110 via the NoC 114 when the processing node 124 is finished with the data, i.e. the data can be written to the memory 110. As can be seen in FIG. 1D, the data can flow to the processing nodes 126, 128 and 130 from the memory 110 via the NoC 114, i.e. the data can be read from the memory 110. Likewise, data can flow back from the processing nodes to the memory 110, i.e. be written to the memory 110, via the NoC 114 when the processing nodes are finished with the data. As can be seen in FIG. 1E, data can flow back from the memory 110 to the processing nodes 124, 126, 128 and 130, i.e. be read from the memory 110, via the NoC 114.

Figure 1F:
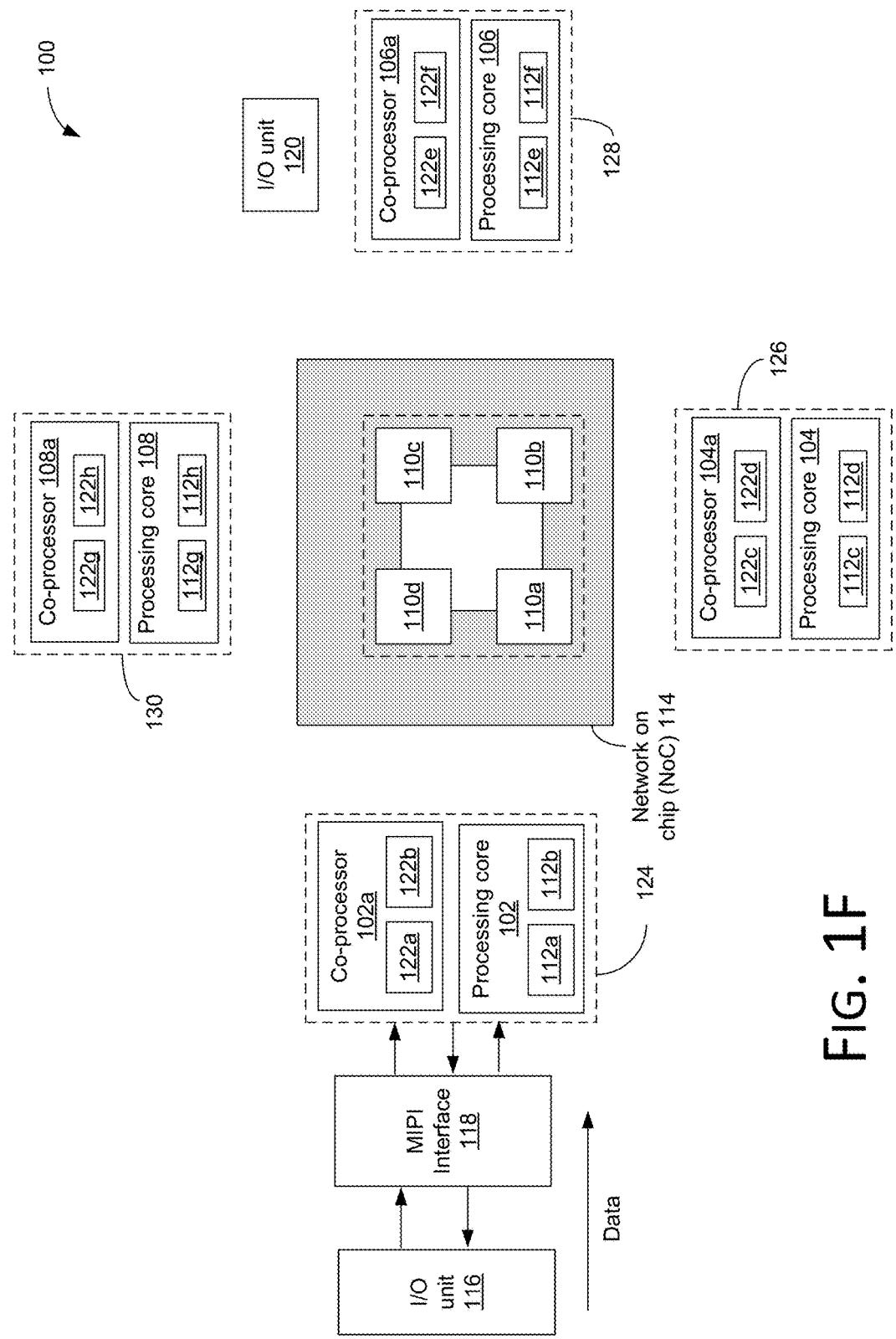

Referring to FIG. 1F, data can also flow from the I/O unit 116 to the MIPI interface 118 to the processing node 124. The processing node 124 can send the data back to the MIPI interface 118, the I/O unit 116 and on to an application processor (not illustrated) when the processing node 124 is finished with the data and none of the other processing nodes 126, 128 and 130 require the data, i.e., the data does not require any further processing.

Figure 1G:
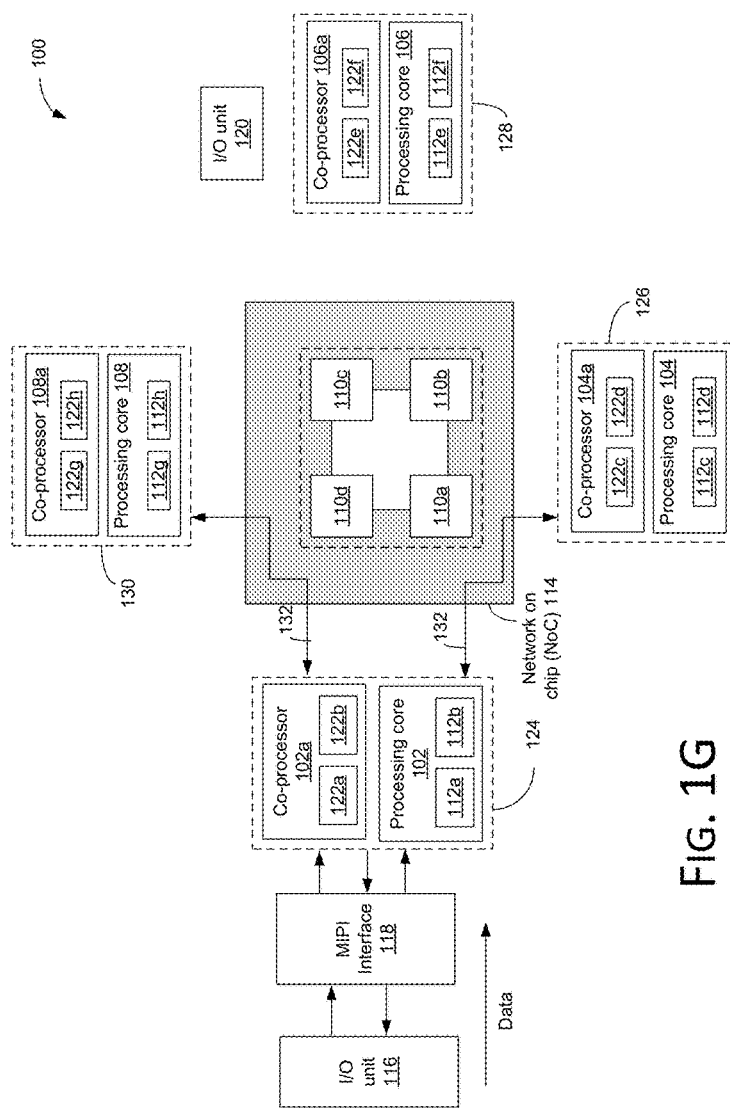
Figure 1H:
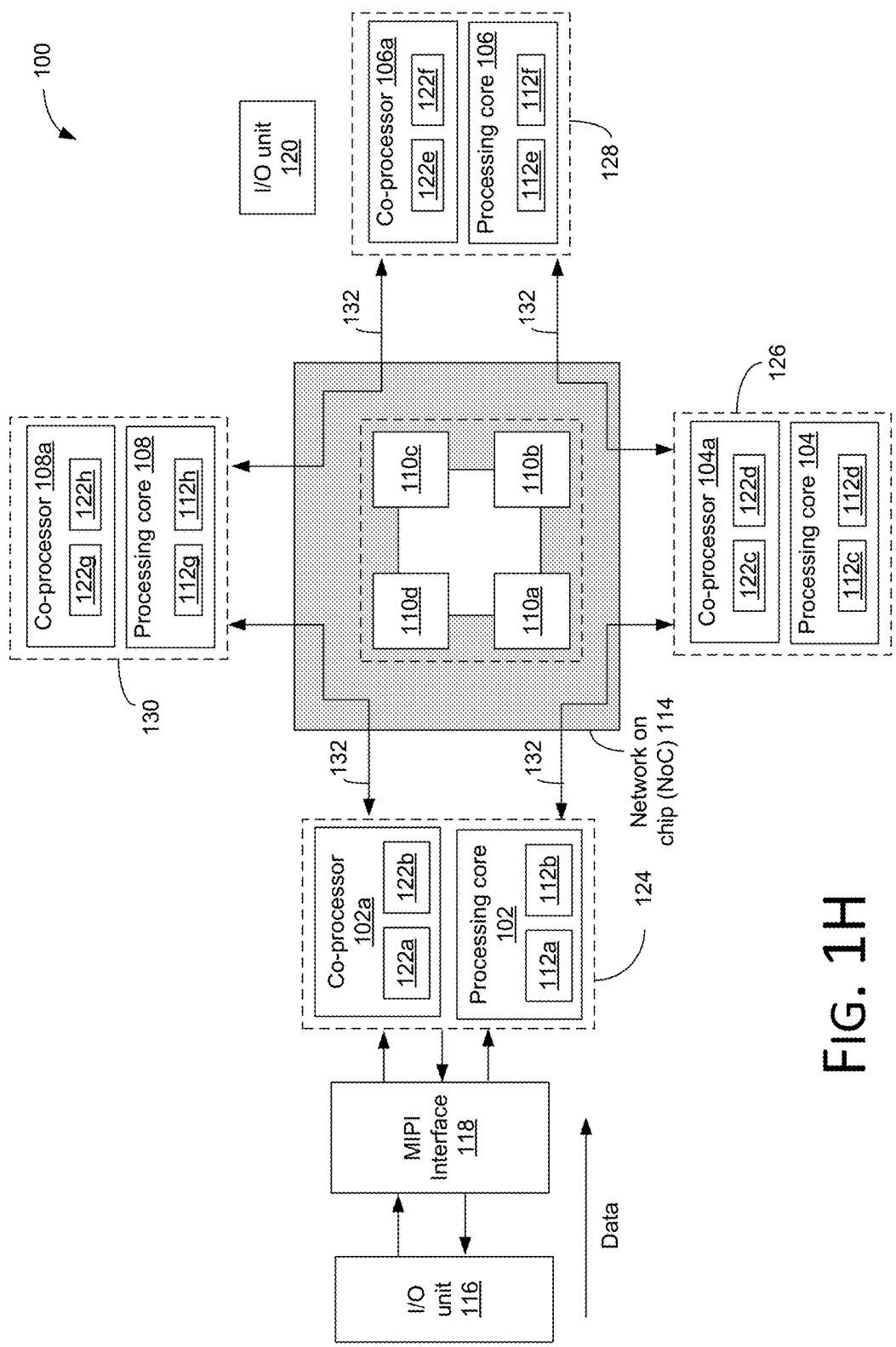
Figure 1I:
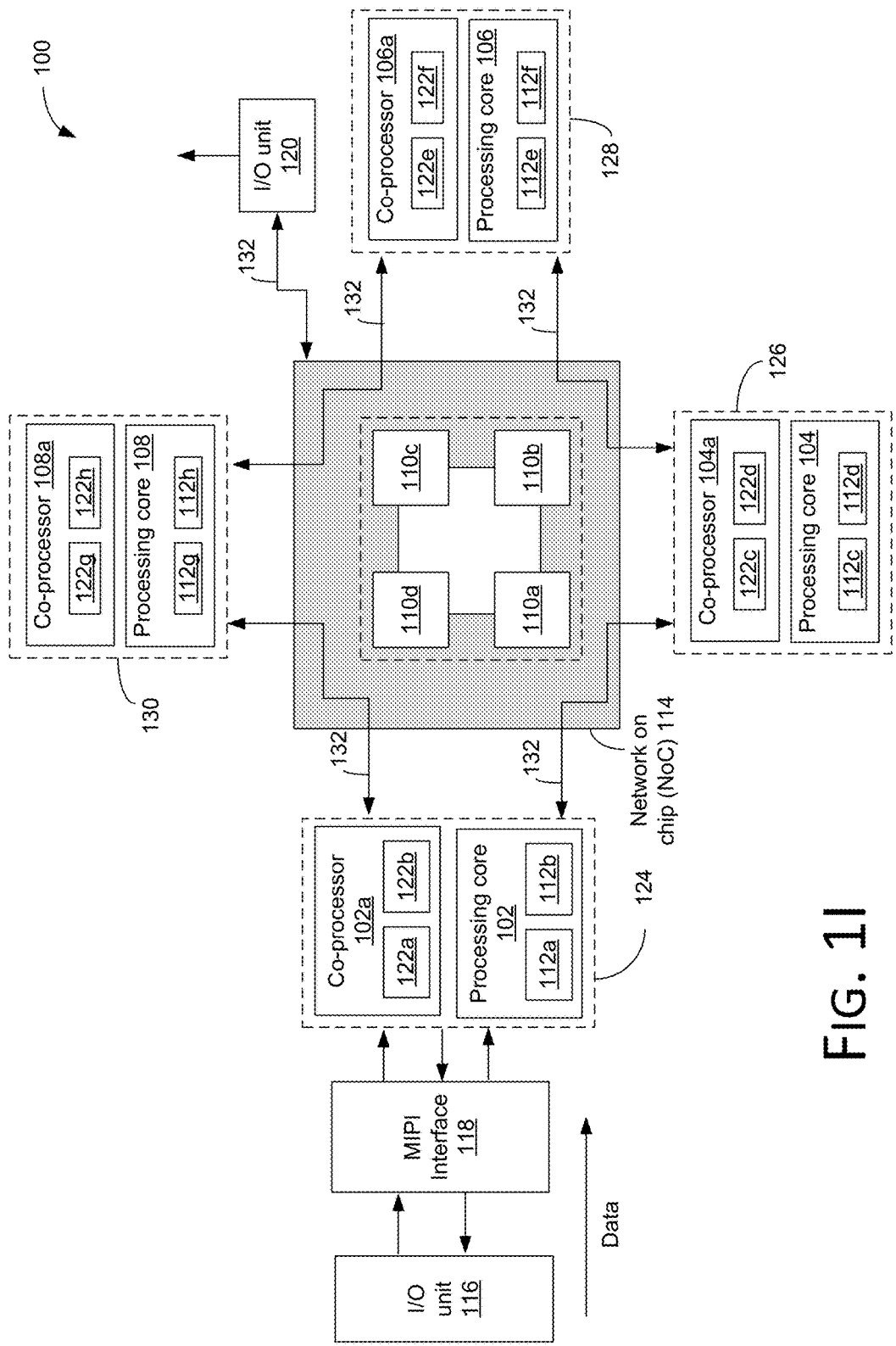

Referring to FIG. 1G, in accordance with embodiments, the processing node 124 can forward the data directly to other processing nodes such as, for example, processing nodes 126 and 130, via the NoC 114 and the channels 132, thereby bypassing the intermediate steps of writing to the memory 110 and reading from the memory 110 by the processing nodes 124, 126, 128 and 130. While not illustrated in FIG. 1G, the processing node 124 can also forward the data directly to the processing node 128, if necessary. As can be seen in FIG. 1H, the data can be directly forwarded from the processing nodes 126 and 130 to the processing node 128 via the NoC 114. The channels 132 of the NoC 114 are also used by the processing nodes 124, 126, 128 and 130 as illustrated and described with reference to FIGS. 1G and 1H to send and receive messages that include memory locations when the data is written to the memory 110 as described with respect to FIGS. 1B-1F. The processing node 128 can also directly forward the data to the I/O unit 120 via the NoC 114 as can be seen in FIG. 1I.

While the NoC 114 makes it very conducive for the processing nodes 124, 126, 128 and 130 to communicate directly with one another, other arrangements may be used to allow the processing nodes 124, 126, 128 and 130 to communicate directly with one another. For example, traces, bond wires, a redistribution layer, etc. in the ASIC 100 may be used.

Figure 2:
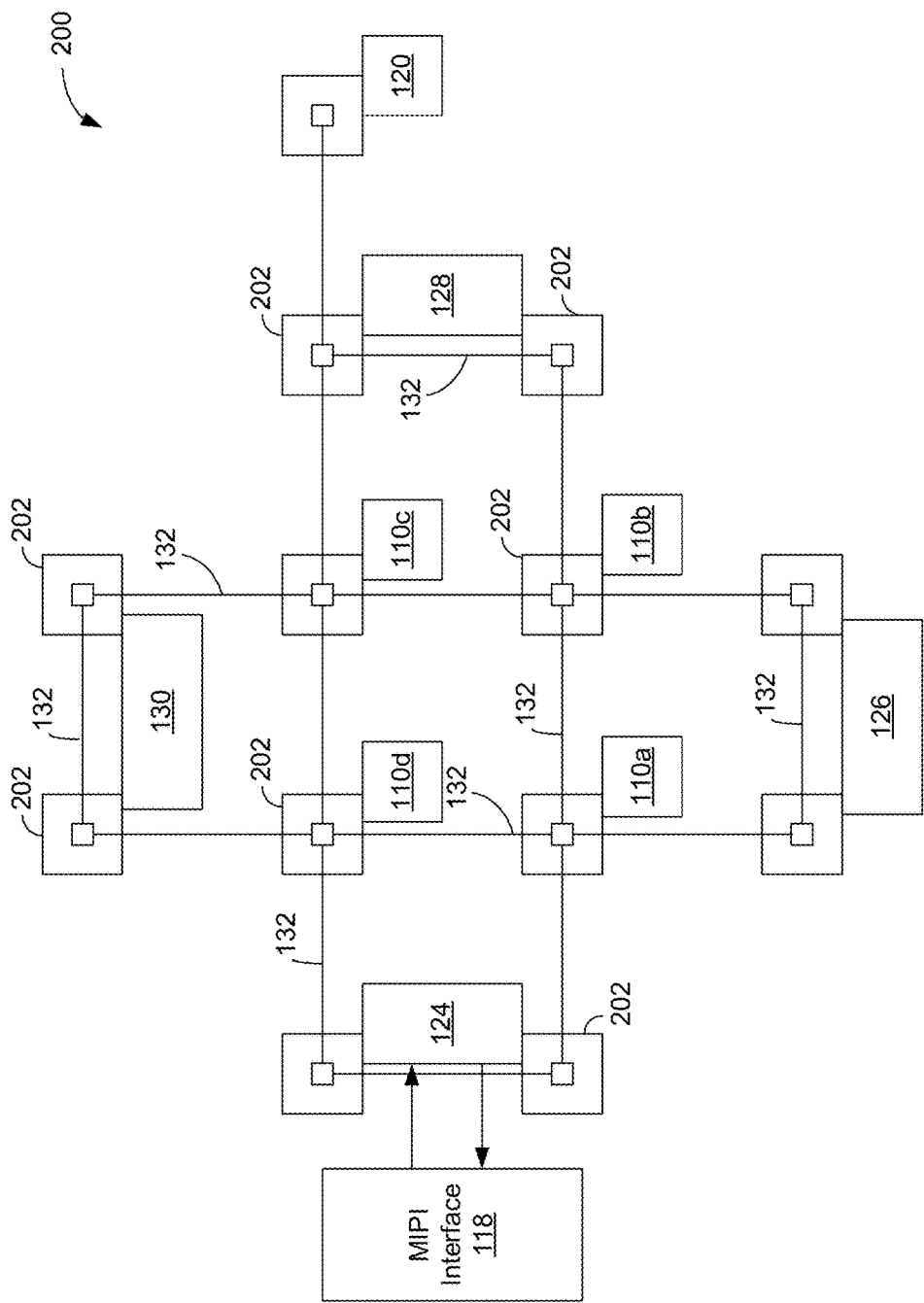
FIG. 2 schematically illustrates a Network-on-Chip coupling nodes of the ASIC of FIGS. 1A-1I, in accordance with various embodiments.

FIG. 2 schematically illustrates an arrangement 200 of the processing nodes 124, 126, 128 and 130, along with the memory 110, being coupled together by the NoC 114. As can be seen, various nodes 202 of the NoC 114 are coupled to the processing nodes 124, 126, 128 and 130, and to the memory 110a, b, c and d by the virtual channels 132. The nodes 202 of the NoC 114 are also coupled to one another by the virtual channels 132 of FIGS. 1B-1I. Thus, as can be seen in FIG. 2, the nodes 202 of the NoC 114 allow for direct communication between the processing nodes 124, 126, 128 and 130, the memory 110 and various other components of the ASIC 100 such as the I/O unit 120. The nodes of the NoC 114 may also be coupled to various other components of the ASIC 100 that are not illustrated for clarity. As can be seen, each of the processing nodes 124, 126, 128 and 130 are coupled to two nodes of the NoC 114. This allows for the corresponding processing core and the corresponding co-processor of each processing node 124, 126, 128 and 130 to be directly coupled to the NoC 114 via the nodes 202 of the NoC 114 by the virtual channels 132. Each of the memories 110a, b, c, and d is only coupled to one corresponding node 202 of the NoC 114 as each of the memories 110a, b, c and d only needs to be coupled to the NoC 14 once.

As previously noted, the send buffers and receive buffers of the processing cores and the co-processors are limited. In the example embodiment previously discussed, the send buffers and the receive buffers were limited to four entries each. Thus, the NoC 114 needs to manage the number of messages sent and received by the various processing cores and co-processors. Thus, a controller (not illustrated) of the NoC 114 can keep track of the number of messages sent and received by the processing cores and the co-processors through, for example, counters, a credit system, information from the processing cores and/or the co-processors, etc. Thus, the controller can keep track of the number of messages within the send buffers 112a, 112c, 112e, 112g, 122a, 122c, 122e and 122g, and the receive buffers 112b, 112d, 112f, 112h, 122b, 122d, 122f and 122h.

Thus, by using the embodiments of NoC routing of messages as described herein, power usage may be reduced by not having to read and write into and from an intermediate memory in between processing nodes. If a processing core or co-processor needs to send or receive a message with the WAIT function activated, the processing core or co-processor can enter a low power state while waiting. The processing cores and co-processors of the processing nodes are able to send messages including data for processing directly to one another. Latency may also be reduced since the next processing core or co-processor of a processing node may start processing as soon as the first byte of a message is available rather than waiting for all or most of the message to be written to an intermediate memory by the previous processing core or co-processor. Additionally, by using the NoC routing of messages as described herein, different routings may be configured as processing requirements change.

Figure 3:
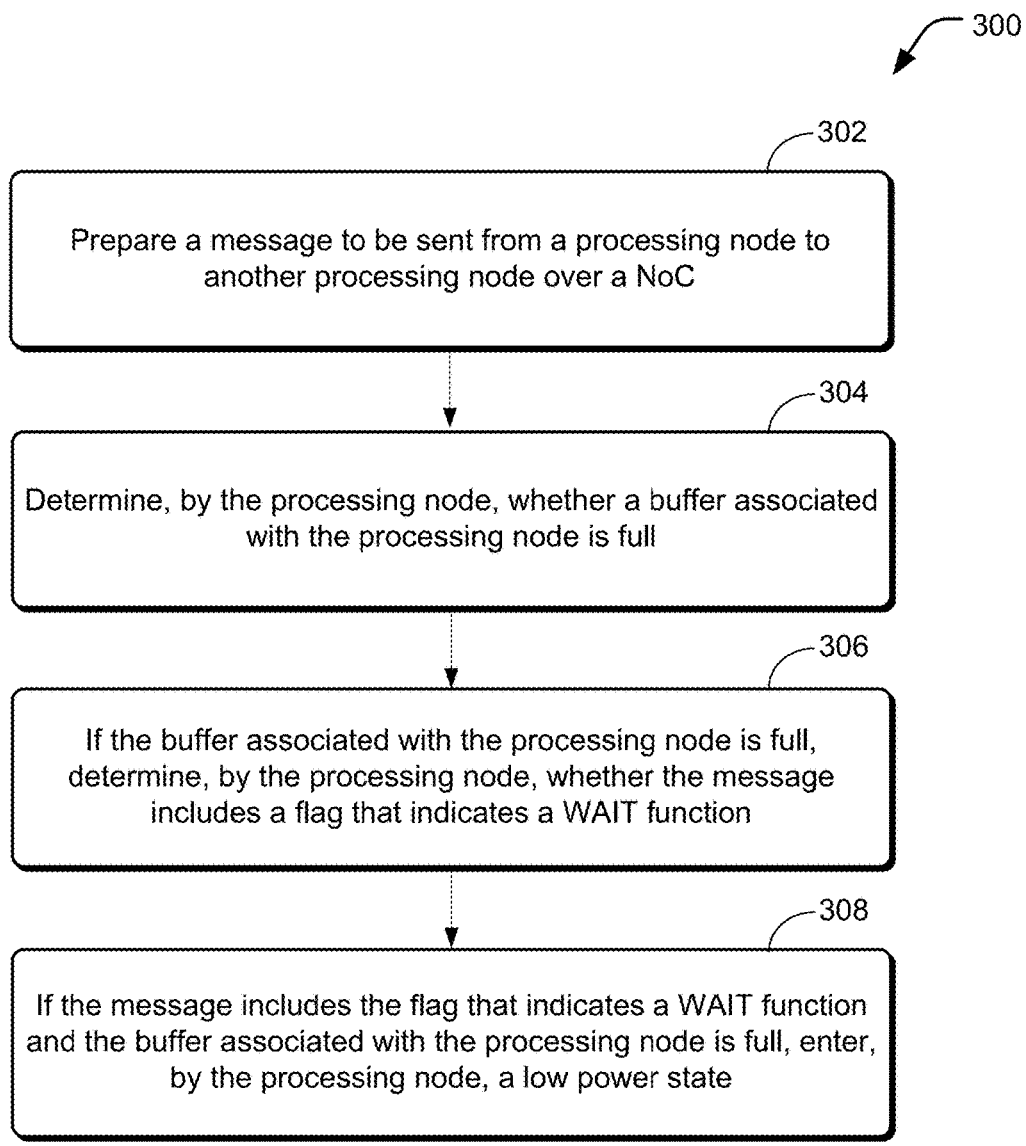
FIG. 3 is a flow diagram illustrating an example of a process of sending messages among a plurality of processing nodes via a network-on-chip (NoC) of the ASIC of FIGS. 1A-1I, in accordance with various embodiments.

FIG. 3 is a flow diagram illustrating an example of a process of an example method 300 of sending messages among a plurality of processing nodes, e.g., processing nodes 124, 126, 128 and 130, via a network-on-chip (NoC), e.g., NoC 114. At 302, a message is prepared to be sent from a processing node to another processing node over the NoC. At 304, the processing node determines whether a buffer associated the processing node is full. At 306, if the buffer associated with the processing node is full, the processing node determines whether the message includes a flag that indicates a WAIT function. At 308, if the message includes the flag that indicates the WAIT function and the buffer associated with the processing node is full, the processing node enters a low power state.

Figure 4:
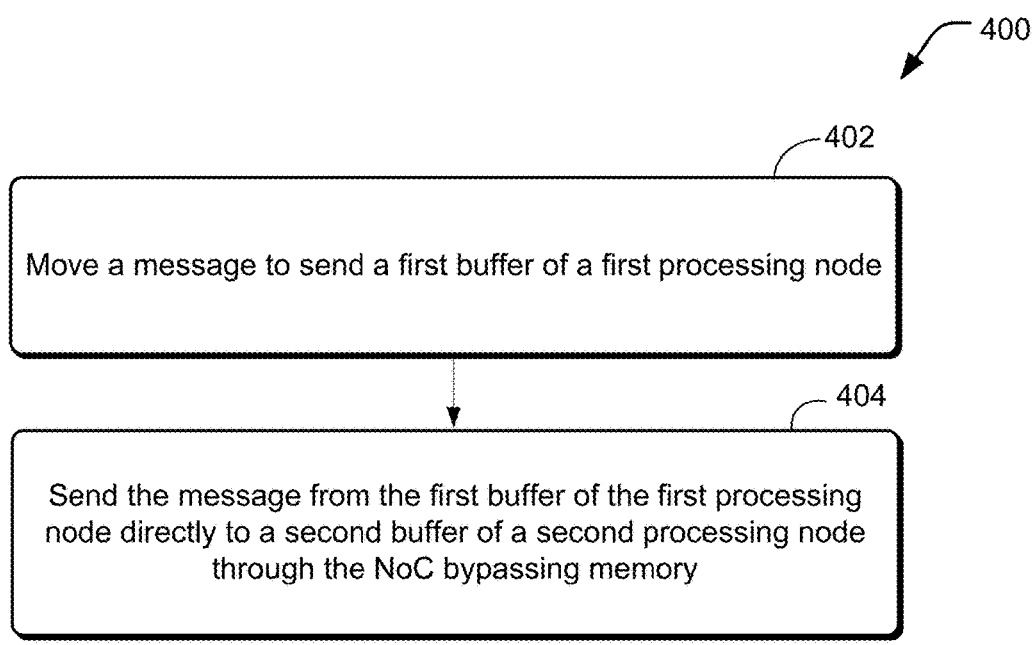
FIG. 4 is a flow diagram illustrating another example of another process of sending and receiving messages among a plurality of processing nodes via a network-on-chip (NoC) of the ASIC of FIGS. 1A-1I, in accordance with various embodiments.

FIG. 4 is a flow diagram illustrating an example of a process of an example method 400 of sending messages among a plurality of processing nodes, e.g., processing cores 124, 126, 128 and 130, via a network-on-chip (NoC), e.g., NoC 114. At 402, a message to send is moved to a first buffer of a first processing node. At 404, the message from the first buffer of the first processing node is sent directly to a second buffer of a second processing node through the NoC bypassing memory.

Figure 5:
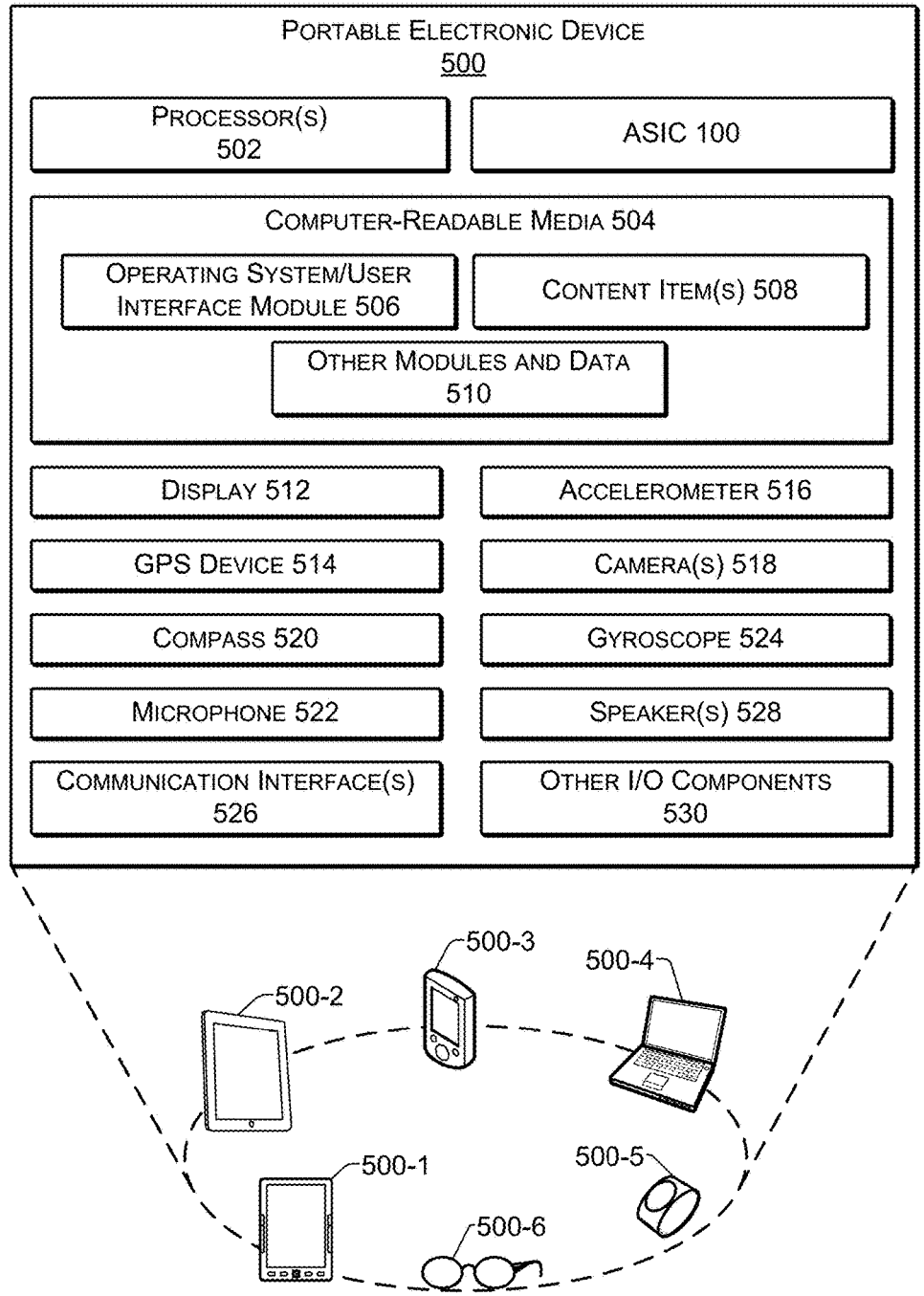
FIG. 5 illustrates select components of an example portable electronic device that includes the ASIC of FIGS. 1A-1I, in accordance with various embodiments.

FIG. 5 illustrates select example components of an example portable electronic device 500 that includes an ASIC 100 as described herein. The portable electronic device 500 may be implemented as any of a number of different types of electronic devices. Some examples of the portable electronic device 500 may include digital media devices and eBook readers 500-1; tablet computing devices 500-2; smartphones, mobile devices and portable gaming systems 500-3; laptop and netbook computing devices 500-4; wearable computing devices 500-5; augmented reality devices, helmets, goggles or glasses 500-6; etc. This list is only an example and is not meant to be limiting.

In a very basic configuration, the portable electronic device 500 includes, or accesses, components such as at least one control logic circuit, central processing unit, application processor, or processor 502, and one or more computer-readable media 504. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable instructions stored in the computer-readable media 504 or other computer-readable media.

Depending on the configuration of the portable electronic device 500, the computer-readable media 504 may be an example of tangible non-transitory computer storage media and may include volatile and nonvolatile memory and/or removable and non-removable media implemented in any type of technology for storage of information such as computer-readable instructions, data structures, program modules or other data. The computer-readable media 504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable electronic device 500 may access external storage, such as RAID storage systems, storage arrays, network attached storage, storage area networks, cloud storage, or any other medium that can be used to store information and that can be accessed by the processor 502 directly or through another computing device or network. Accordingly, the computer-readable media 504 may be computer storage media able to store instructions, modules or components that may be executed by the processor 502.

The computer-readable media 504 may be used to store and maintain any number of functional components that are executable by the processor 502. In some implementations, these functional components comprise instructions or programs that are executable by the processor 502 and that, when executed, implement operational logic for performing some actions described herein. Functional components of the portable electronic device 500 stored in the computer-readable media 504 may include an operating system/user interface module 506 for controlling and managing various functions of the portable electronic device 500.

In addition, the computer-readable media 504 may also store data, data structures and the like, that are used by the functional components. For example, data stored by the computer-readable media 504 may include user information and, optionally, one or more content items 508. Depending on the type of the portable electronic device 500, the computer-readable media 504 may also optionally include other functional components and data, such as other modules and data 510, which may include programs, drivers and so forth, and the data used by the functional components. Further, the portable electronic device 500 may include many other logical, programmatic and physical components, of which those described are merely examples that are related to the discussion herein. Further, while the figures illustrate the functional components and data of the portable electronic device 500 as being present on the portable electronic device 500 and executed by the processor 502 on the portable electronic device 500, it is to be appreciated that these components and/or data may be distributed across different computing devices and locations in any manner.

FIG. 5 further illustrates other components of the example of the portable electronic device 500. Such examples include a display 512 and various types of sensors, which may include a GPS device 514, an accelerometer 516, one or more cameras 518, a compass 520, a microphone 522, a gyroscope 524, and so forth. In accordance with various embodiments, the portable electronic device includes at least four corner cameras located at corners and/or edges of the display 512.

The portable electronic device 500 may further include one or more communication interfaces 526, which may support both wired and wireless connection to various networks, such as cellular networks, radio, Wi-Fi networks, close-range wireless connections, near-field connections, infrared signals, local area networks, wide area networks, the Internet, and so forth. The communication interfaces 526 may further allow a user to access storage on or through another device, such as a remote computing device, a network attached storage device, cloud storage, or the like.

The portable electronic device 500 may further be equipped with one or more speakers 528 and various other input/output (I/O) components 530. Such I/O components 530 may include a touchscreen and various user controls (e.g., buttons, a joystick, a keyboard, a keypad, etc.), a haptic or tactile output device, connection ports, physical condition sensors, and so forth. For example, the operating system 506 of the portable electronic device 500 may include suitable drivers configured to accept input from a keypad, keyboard, or other user controls and devices included as the I/O components 530. The display 512 may be configured as a touchscreen or the portable electronic device 500 may include a separate touchscreen. The processor 502 can perform one or more functions attributed to a graphic controller (not illustrated) for the display 512. Functional components of the portable electronic device 500 stored in the computer-readable media 504 may include the user interface module 506 for controlling and managing various functions of the portable electronic device 500, and for generating one or more user interfaces on the display 512 of the portable electronic device 500. Additionally, the portable electronic device 500 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these program modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An Application Specific Integrated Circuit (ASIC) including:
   a first processing core, wherein the first processing core includes a first send first-in first-out (FIFO) buffer configured to send messages to be sent by the first processing core and a first receive FIFO buffer configured to receive messages from other processing cores;
   a second processing core, wherein the second processing core includes a second send FIFO buffer configured to send messages to be sent by the second processing core and a second receive FIFO buffer configured to receive messages from other processing cores;
   a third processing core, wherein the third processing core includes a third send FIFO buffer configured to send messages to be sent by the third processing core and a third receive FIFO buffer configured to receive messages from other processing cores;
   a fourth processing core, wherein the fourth processing core includes a fourth send FIFO buffer configured to send messages to be sent by the fourth processing core and a fourth receive FIFO buffer configured to receive messages from other processing cores;
   memory; and
   a network-on-chip (NoC) coupled to the first, second, third and fourth processing cores, wherein the processing cores are configured to send messages directly to other processing cores via the NoC bypassing the memory and to receive messages directly from the other processing cores via the NoC bypassing the memory,
   wherein at least the first processing core is configured such that when a message that includes a flag that indicates a WAIT function is to be sent by the first processing core to one of (i) a second processing core of the plurality of processing cores or (ii) the memory, and the first FIFO buffer of the first processing core is full, the first processing core enters a low power state.

2. The ASIC of claim 1, wherein at least the first processing core is configured to enter a low power state when the first send FIFO buffer of the first processing core is full.

3. The ASIC of claim 1 wherein at least the first processing core is configured to enter a low power state when the first receive FIFO buffer of the first processing core is empty.

4. The ASIC of claim 1, wherein each of the first, second, third and fourth send FIFO buffers and each of the first, second, third and fourth receive FIFO buffers is configured to store a maximum of four messages.

5. The ASIC of claim 1, wherein at least the first processing core is further configured such that if a controller of the NoC indicates that the second receive FIFO buffer of the second processing core is full, the first processing core enters the low power state.

6. The ASIC of claim 1, wherein the at least the first processing core is further configured to ignore a message if the first FIFO buffer is full and the message does not include a flag that indicates a WAIT function.

7. A circuit including:
   a plurality of processing cores, wherein each processing core is associated with a corresponding first buffer and a corresponding second buffer;
   memory; and
   a network-on-chip (NoC) coupled to the plurality of processing cores, wherein the processing cores are configured to send messages directly to other processing cores via the NoC bypassing the memory and to receive messages directly from other processing cores via the NoC bypassing the memory,
   wherein at least a first processing core is configured such that when a message that includes a flag that indicates a WAIT function is to be sent by the first processing core to one of (i) a second processing core of the plurality of processing cores or (ii) the memory and the first buffer of the first processing core is full, the first processing core enters a low power state.

8. The circuit of claim 7, wherein each first buffer and each second buffer is configured to store a maximum of four messages.

9. The circuit of claim 7, wherein the plurality of processing cores comprises four processing cores.

10. The circuit of claim 7, wherein at least a first processing core of the plurality of processing cores is configured to enter a low power state when the corresponding first buffer of the first processing core is full.

11. The circuit of claim 10 wherein at least the first processing core is further configured such that after the first processing core enters the low power state, the first processing core remains in the low power state until a first buffer of the first processing core is no longer full.

12. The circuit of claim 10, wherein entering the low power state comprises deactivating a clock of the first processing core, wherein the first clock comprises one or more of a clock for instruction fetching, a clock for instruction decoding, a clock for instruction execution, a clock for memory writing-back, and a clock for register writing-back.

13. The circuit of claim 12, wherein a second clock of the processing core that is not deactivated is used to one or more of (i) send and receive messages, (ii) handle traffic to and from memory, and (iii) handle interrupts.

14. The circuit of claim 7, wherein at least a first processing core of the plurality of processing cores is configured to enter a low power state when the second buffer of the first processing core is empty.

15. The circuit of claim 14, wherein the first processing core is further configured such that when the first processing core enters the low power state, the first processing core remains in the low power state until the first buffer of the first processing core is no longer empty.

16. The circuit of claim 14, wherein entering the low power state comprises deactivating a clock of the first processing core, wherein the first clock comprises one or more of a clock for instruction fetching, a clock for instruction decoding, a clock for instruction execution, a clock for memory writing-back, and a clock for register writing-back.

17. The circuit of claim 16, wherein a second clock of the first processing core that is not deactivated is used to one or more of (i) send and receive messages, (ii) handle traffic to and from memory, and (iii) handle interrupts.

18. The circuit of claim 7, wherein at least the first processing core is further configured such that if a controller of the NoC indicates that the second receive FIFO buffer of the second processing core is full, the first processing core enters the low power state.

19. The circuit of claim 7, wherein the at least the first processing core is further configured to ignore a message if the first buffer is full and the message does not include a flag that indicates a WAIT function.

20. A method of sending messages among a plurality of processing nodes via a network-on-chip (NoC), wherein the plurality of processing nodes and NoC are included within an ASIC, the method comprising:
   moving a message to send to a first buffer of a first processing node; and
   sending the message from the first buffer of the first processing node directly to a second buffer of a second processing node through the NoC bypassing memory,
   wherein the first processing core is configured such that when the message to send includes a flag that indicates a WAIT function and the first buffer is full, the first processing node enters a low power state.

21. The method of claim 20, further comprising if the second buffer is full, holding the message in the first buffer and activating, by the first processing node, a low power state until the second buffer is not full.

22. The method of claim 21, wherein activating the low power state comprises deactivating a clock of the processing node, wherein the first clock comprises one or more of a clock for instruction fetching, a clock for instruction decoding, a clock for instruction execution, a clock for memory writing-back, and a clock for register writing-back.

23. The method of claim 22, wherein a second clock of the processing node that is not deactivated is used to one or more of (i) send and receive messages, (ii) handle traffic to and from memory, and (iii) handle interrupts.

24. The method of claim 20, further comprising if the second buffer is empty, activating, by the second processing node, a low power state until the second buffer is not empty.

* * * * *